Patented June 28, 1927.

1,633,929

UNITED STATES PATENT OFFICE.

WALTER DUISBERG, OF LEVERKUSEN, NEAR COLOGNE, AND WINFRID HENTRICH, LUDWIG ZEH, AND JOHANN HUISMANN, OF WIESDORF, NEAR COLOGNE, GERMANY, ASSIGNORS TO GRASSELLI DYESTUFF CORPORATION, OF NEW YORK, N. Y., A CORPORATION OF DELAWARE.

OMEGA-AMINOALKYL-AMINONAPHTHALENES.

No Drawing. Application filed April 17, 1925, Serial No. 23,962, and in Germany May 21, 1924.

We have invented new and useful improvements in omega-aminoalkyl-aminonaphthalenes, of which the following is a specification.

This invention is for the purpose of producing in a novel and practical way naphthylamines, substituted in the amino group by an alkylamino group and for certain new thus substituted naphthylamines.

Omega-aminoalkyl-1-aminonaphthalenes could heretofore only be produced with vary low yields and by a very complicated and unpractical process (see Berichte der Deutschen Chemischen Gesellschaft, 1891, vol. 24, page 2199). Furthermore if the classical reaction of acting with ammonia or aliphatic amines (see for instance German Patent 121,683) upon sulphurous acid esters of hydroxynaphthalenes is applied to aliphatic diamines no corresponding omega-aminoalkyl-aminonaphthalenes are obtained and no reaction was known until now which allowed of the preparation of beta naphthylamines substituted in the amino group by an aminoalkyl radical.

We have now found that by acting with aliphatic diamines in presence of soluble sulphurous acid salts upon naphthol carboxylic acids the hydroxyl group is replaced by an aminoalkylamino group, with a simultaneous elimination of the carboxyl group.

This reaction is particularly efficient in the case of the naphtholcarboxylic acids, in which the hydroxyl and carboxylic groups are in ortho position to each other; compounds of this type are 2-naphthol-3-carboxylic acid, 1-naphthol-2-carboxylic acid, 2-naphthol-1-carboxylic acid. The omega-aminoalkyl-aminonaphthalenes are obtained with our novel process in a high state of purity and with exceedingly good yields.

The type of reaction involved can be represented by the general formula

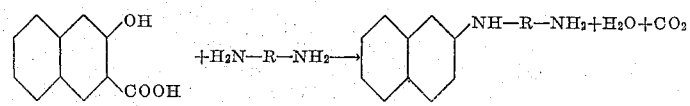

in which formula R stands for an alkylene radical.

Although the sulphurous acid salts do not appear in this formula they play an essential part in the acomplishing of our reaction. It is being assumed that the naphthol-hydroxyl group reacts first with the sulphurous acid to form the intermediate step of a naphthol sulphurous acid ester, which reacts then with one of the amino groups of the alkylenediamine. The manner in which the carboxyl group participates in the reaction and the reasons for its elimination are not perfectly understood, its effect is however to minimize, if not entirely cut out, side reactions and formation of by-products.

It has furthermore been found that contrary to what might have been expected only one of the amino-groups of the alkylene diamines reacts substantially with the naphthol-carboxylic acids.

In certain prefered embodiments of our invention we use the alkali metal bisulphites, which term is understood to include ammonium bisulphite.

Our new invention has been extended to a wide range of aliphatic diamines and it has been found that the length of the carbon chain between the two amino groups is immaterial to the performance of the reaction, as for instance tetramethylenediamine reacts just as easily as ethylene diamine; furthermore substitution such as obtained in di-(beta-aminoethyl)-amine $H_2N-CH_2-CH_2-NH-CH_2-CH_2-NH_2$ has no adverse influence on the reaction.

The alkylene diamines can be used in the free state, as salts or hydrates, as found convenient in the different cases.

The new omega-aminoalkyl-2-aminonaphthalenes as obtained with our new process are usually colorless substances, difficultly soluble in water, forming salts with mineral acids, which salts are usually easily soluble in water; with nitrous acid they form colored, usually water-soluble, bodies. They are valuable intermediates for the production of dyestuffs and pharmaceuticals.

It will, of course, be understood that our invention is not limited to any particular manipulation in effecting the reaction; solvent used, concentration of the reacting solutions, temperatures, pressures, times of reaction, etc. can be varied in wide limits without departing from the spirit of our invention, the optimum conditions always depending upon the particular components used.

In order to further illustrate our invention, the following examples are given, the parts being by weight.

*Example 1.*—38 parts 2-naphthol-3-carboxylic acid are dissolved boiling hot in a small amount of water with the requisite amount of caustic soda. 40 parts ethylenediamine hydrate and 300–400 parts sodium bisulphite solution 38° Bé. are added. Whilst stirring this solution is heated to 90–100° C. until no more carbon dioxid is evolved. A crystalline slightly yellowish colored precipitate separates. It is after cooling filtered off, washed first with a sodium chloride solution, then with water. In order to purify this product from small amounts of beta-naphthol which might have formed, it is treated with a hot, diluted solution of caustic soda, filtered off and washed with water; the filtrate contains then all of the beta-naphthol formed. The precipitate is in the dry state, a granular, greyish-white mass, which by standing in the air becomes somewhat brownish. It is the omega-aminoethyl-2-aminonaphthalene of the formula

It reacts with nitrous acid, giving a yellow colored solution. It is soluble in diluted hydrochloric acid, from which solution concentrated hydrochloric acid precipitates the crystalline omega-aminoethyl-2-aminonaphthalene chlorhydrate.

*Example 2.*—38 parts 2-naphthol-3-carboxylic acid and 70 parts tetramethylendiamine chlorhydrate are dissolved in a concentrated solution of 30 parts potassium hydroxide in water. 400 parts commercial sodium bisulphite solution (38° Bé.) and 100 parts of 30% ammonium bisulphite solution are added and the solution heated to 90° C. until all the carbon dioxide has been liberated. After cooling the precipitate is filtered off, suspended in 100 parts water and boiled with so much concentrated hydrochloric acid as to give a distinct acid reaction to Congo paper. The filtrate contains the omega-aminotetramethylene-2-aminonaphthalene as the chlorhydrate. It is obtained therefrom by precipitation with concentrated hydrochloric acid, in the form of small colorless prismatic crystals. The free base is obtained by adding caustic alkali to the above filtrate. It is a light greyish powder insoluble in water. Nitrous acid acts in water solution upon the hydrochloride in giving a light yellow colored solution.

The omega-aminotetramethylene-2-aminonaphthalene has most probably the formula

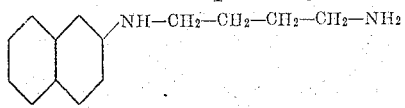

*Example 3.*—225 parts 1-naphthol-2-carboxylic acid are suspended in 180 parts hot water and 575 parts of a 20% ethylenediamine water solution added. This solution is then heated on the water bath with 2400 parts of sodium bisulphite solution (40° Bé.) until the evolution of carbondioxide has ceased. The reaction product is then made slightly soda alkaline and stirred at 90° C. for a while. Slight amounts of alpha naphthol which might have formed are dissolved by this treatment. The hot reaction product is then filtered and the precipitate washed with water. Boiled with 150 parts concentrated hydrochloric acid and 2500 parts of water the omega-aminoethylamino-1-naphthol contained in the precipitate goes into solution. It is filtered again and the filtrate made strongly alkaline with caustic soda. The omega-aminoethyl-1-aminonaphthalene precipitates as colorless floccules. Its chlorhydrate forms fine crystalline needles, easily soluble in water.

*Example 4.*—339 parts 2-naphthol-3-carboxylic acid are suspended in 200 parts hot water, to which are added 293 parts diethylene triamine (di-(beta aminoethyl)-amine) $H_2N-CH_2-CH_2-NH-CH_2-CH_2-NH_2$ and 2000 parts of 38° Bé. sodium bisulphite solution. Whilst stirring, the reaction mass is heated to 95° C. until all the carbon dioxide is evolved. The yellowish granular precipitate is filtered off cold, washed with about 4000 parts water of about 60° C., treated with 200 parts concentrated caustic soda, and again filtered off. The precipitate is now boiled with 5000 parts water and 850 parts concentrated hydrochloric acid, then filtered hot.

By cooling the chlorhydrate of the omega-amino-ethylaminoethyl-2-aminonaphthalene separates in clusters of needle shaped crystals. The free base which has most probably the formula

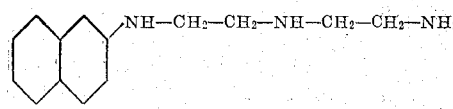

is obtained by treating the chlorhydrate with caustic alkali.

*Example 5.*—18.8 parts 2-naphthol-1-carboxylic acid are dissolved in hot water with the addition of a little ammonia. To this solution 20 parts ethylenediamine hydrate and 200 parts commercial sodium bisulphite solution (38° Bé.) are added, heated to 90° C. the reaction proceeds quickly, all the carbon dioxide being soon liberated. The precipitate formed is filtered off cold, boiled with 12 parts concentrated caustic soda and 100 parts water, filtered hot, dissolved in dilute muriatic acid, and precipitated as chlorhydrate by the addition of concentrated hydrochloric acid. The so obtained chlorhydrate of the omega-aminoethyl-2-aminonaphthalene is identical with the chlorhydrate described in Example 1.

We claim:—

1. The process of producing omega-aminoalkyl-aminonaphthalenes, which consists in reacting with aliphatic diamines upon ortho-hydroxy-naphthalene-carboxylic acids in presence of sulphurous acid compounds.

2. The process of producing omega-aminoalkyl-aminonaphthalenes, which consists in reacting in aqueous solution with aliphatic diamines upon ortho-hydroxy-naphthalene-carboxylic acids in presence of sulphurous acid compounds.

3. The process of producing omega-aminoalkyl-aminonaphthalenes, which consists in reacting with aliphatic diamines upon ortho-hydroxy-naphthalene-carboxylic acids in presence of soluble sulphurous acid salts.

4. The process of producing omega-aminoalkyl-aminonaphthalenes, which consists in reacting in aqueous solution with aliphatic diamines upon ortho-hydroxy-naphthalene-carboxylic acids in presence of soluble sulphurous acid salts.

5. The process of producing omega-aminoalkyl-aminonaphthalenes, which consists in reacting with aliphatic diamines upon ortho-hydroxy-naphthalene-carboxylic acids in presence of alkali metal bisulphites.

6. The process of producing omega-aminoalkyl-aminonaphthalenes, which consists in reacting in aqueous solution with aliphatic diamines upon ortho-hydroxy-naphthalene-carboxylic acids in presence of alkali metal bisulphites.

7. The process of producing omega-aminoethyl-2-aminonaphthalene, which consists in reacting in water solution with ethylenediamine upon 2-naphthol-3-carboxylic acid in presence of sodium bisulphite.

8. In a process of producing omega-aminoethyl-2-aminonaphthalene the steps comprising dissolving ethylene diamine and 2-naphthol-3-carboxylate of sodium in water, adding thereto sodium bisulphite solution, heating the reaction to a temperature of about 90–100° C. and isolating the omega-aminoethyl-aminonaphthalene formed from the reaction mass.

9. As new products omega-aminoalkyl-2-aminonaphthalenes of the general formula

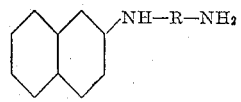

in which formula R represents an alkylene group, which products are greyish white solid substances, difficultly soluble in water, easily soluble in dilute mineral acids, forming well crystallized salts with mineral acids and reacting with nitrous acid with formation of colored solutions.

10. As a new product omega-aminoethyl-2-aminonaphthalene of the formula

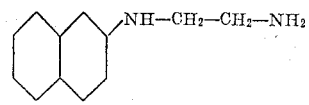

which product is a greyish-white powder, difficultly soluble in water, easily soluble in dilute mineral acids, forming a well crystallized hydrochloride and giving with nitrous acid in water solution a yellow coloration.

In testimony whereof we have hereunto set our hands.

WALTER DUISBERG.
WINFRID HENTRICH.
LUDWIG ZEH.
JOHANN HUISMANN.